(12) United States Patent
Kawasaki et al.

(10) Patent No.: US 10,078,706 B2
(45) Date of Patent: Sep. 18, 2018

(54) INFORMATION PROCESSING APPARATUS, INFORMATION PROCESSING METHOD, INFORMATION PROCESSING PROGRAM, AND RECORDING MEDIUM STORING THEREON INFORMATION PROCESSING PROGRAM WHICH CLASSIFIES AND DISPLAYS A PLURALITY OF ELEMENTS CONSTITUTING A LIST ON A PLURALITY OF PAGES

(75) Inventors: Fumihiro Kawasaki, Shinagawa-ku (JP); Atsuyoshi Matsuda, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 0 days.

(21) Appl. No.: 14/369,473

(22) PCT Filed: Jul. 4, 2012

(86) PCT No.: PCT/JP2012/067048
§ 371 (c)(1),
(2), (4) Date: Jul. 11, 2014

(87) PCT Pub. No.: WO2013/099327
PCT Pub. Date: Jul. 4, 2013

(65) Prior Publication Data
US 2014/0365867 A1    Dec. 11, 2014

(30) Foreign Application Priority Data

Dec. 28, 2011  (JP) .................................. 2011-287886

(51) Int. Cl.
*G06F 17/00*    (2006.01)
*G06F 17/30*    (2006.01)

(52) U.S. Cl.
CPC ................................ *G06F 17/3089* (2013.01)

(58) Field of Classification Search
CPC ................................................. G06F 17/3089
See application file for complete search history.

(56) References Cited

U.S. PATENT DOCUMENTS 6,009,439 A * 12/1999 Shiomi ............... G06F 17/3061
7,917,511 B2 * 3/2011 Cannon ............ G06F 17/30265
707/737

(Continued)

FOREIGN PATENT DOCUMENTS

JP    2002-183039 A    6/2002
JP    2004-145631 A    5/2004

OTHER PUBLICATIONS

International Search Report of PCT/JP2012/067048, dated Sep. 18, 2012.

*Primary Examiner* — Howard Cortes
(74) *Attorney, Agent, or Firm* — Sughrue Mion, PLLC

(57) ABSTRACT

Provided are an information processing apparatus, an information processing method, an information processing program, and a recording medium storing thereon the information processing program, which are capable of dividing and displaying a number of elements on a plurality of pages while maintaining the property that it is easy to compare elements with each other. A plurality of element groups is determined based on a classification criterion corresponding to an attribute of an element that constitutes a list, and the respective element groups are allocated to any one of a plurality of pages so that all elements included in each of the determined plurality of element groups are displayed on the same page.

9 Claims, 12 Drawing Sheets

(56) References Cited

U.S. PATENT DOCUMENTS

| | | | |
|---|---|---|---|
| 9,021,370 B1* | 4/2015 | Carlson | G06Q 30/0607 |
| | | | 715/751 |
| 2005/0094191 A1* | 5/2005 | Vondran, Jr. | G06F 3/1212 |
| | | | 358/1.15 |
| 2006/0224604 A1* | 10/2006 | Landsman | G06Q 10/107 |
| 2009/0055390 A1* | 2/2009 | Maeda | G06F 17/30707 |
| 2009/0138817 A1* | 5/2009 | Oron | G06F 17/30905 |
| | | | 715/788 |
| 2009/0199099 A1* | 8/2009 | Girgensohn | G11B 27/28 |
| | | | 715/719 |
| 2009/0216692 A1* | 8/2009 | Saito | G06F 17/30743 |
| | | | 706/12 |
| 2009/0228826 A1* | 9/2009 | Gilmore | G06F 17/30991 |
| | | | 715/781 |
| 2009/0249177 A1* | 10/2009 | Yamaji | G06T 11/60 |
| | | | 715/204 |
| 2009/0259624 A1* | 10/2009 | DeMaris | G06F 17/30448 |
| 2011/0126156 A1* | 5/2011 | Krishnaraj | G06F 3/016 |
| | | | 715/828 |
| 2011/0191303 A1* | 8/2011 | Kaufman | G06F 17/30286 |
| | | | 707/684 |
| 2012/0144325 A1* | 6/2012 | Mital | G06F 9/4446 |
| | | | 715/763 |

* cited by examiner

| MEMBERSHIP INFORMATION DB |
|---|
| USER ID |
| PASSWORD |
| NICKNAME |
| NAME |
| DATE OF BIRTH |
| GENDER |
| ZIP CODE |
| ADDRESS |
| TELEPHONE NUMBER |
| EMAIL ADDRESS |
| . . . . . |

| GENRE INFORMATION DB |
|---|
| GENRE ID |
| GENRE NAME |
| GENRE LEVEL |
| PARENT GENRE ID |
| CHILD GENRE ID LIST |
| . . . . . |

| SHOP INFORMATION DB |
|---|
| SHOP ID |
| PASSWORD |
| SHOP NAME |
| ZIP CODE |
| ADDRESS |
| TELEPHONE NUMBER |
| EMAIL ADDRESS |
| SHOP EVALUATION INFORMATION |
| . . . . . |

| ITEM INFORMATION DB |
|---|
| ITEM ID |
| SHOP ID |
| ITEM CODE |
| GENRE ID |
| ITEM NAME |
| ITEM DESCRIPTION |
| ITEM PRICE |
| RELEASE DATE OF ITEM |
| GRANT POINT OF ITEM |
| EVALUATION OF ITEM |
| . . . . . |

| BROWSING HISTORY DB |
|---|
| USER ID |
| PAGE URL |
| ITEM ID |
| ITEM CODE |
| ITEM NAME |
| GENRE ID |
| SHOP ID |
| BROWSING DATE |
| . . . . . |

| PURCHASE HISTORY DB |
|---|
| USER ID |
| SHOP ID |
| ITEM CODE |
| ITEM NAME |
| GENRE ID |
| SHOP ID |
| NUMBER OF PURCHASES |
| PURCHASE PRICE |
| PURCHASE DATE |
| . . . . . |

| REFERENCE LIST REGISTRATION HISTORY DB |
|---|
| USER ID |
| ITEM ID |
| ITEM CODE |
| ITEM NAME |
| GENRE ID |
| SHOP ID |
| REGISTRATION DATE |
| . . . . . |

FIG.4

DISPLAY SCREEN

| ARRANGEMENT ORDER: STANDARD | LOWEST PRICE FIRST | HIGHEST EVALUATION FIRST | GENRE ORDER | DATE OF RELEASE ORDER |
|---|---|---|---|---|

1ST HIT TO 10TH HITS (106 HITS IN TOTAL) NEXT 10 HITS  1 | 2 | 3 | 4 | 5 | 6 | 7 | 8 | 9 | 10 | 11

| ITEM IMAGE | ITEM NAME AND ITEM DESCRIPTION | ITEM PRICE |
|---|---|---|
|  | ITEM XXX ········ | 2,000 YEN |
|  | ITEM YYY ········ | 3,050 YEN |
|  | ITEM UUU ········ | 4,100 YEN |
|  | ITEM PPP ········ | 2,120 YEN |
|  | ITEM EEE ········ | 1,125 YEN |
|  | ITEM WWW ········ | 3,150 YEN |
|  | ITEM GGG ········ | 1,150 YEN |
|  | ITEM HHH ········ | 1,170 YEN |
|  | ITEM SSS ········ | 3,180 YEN |
|  | ITEM ZZZ ········ | 1,200 YEN |

PAGE

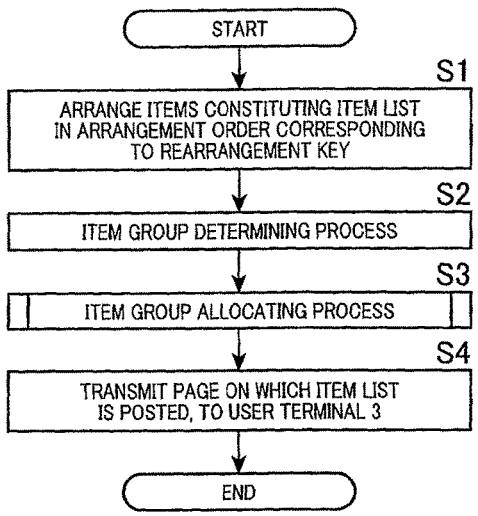
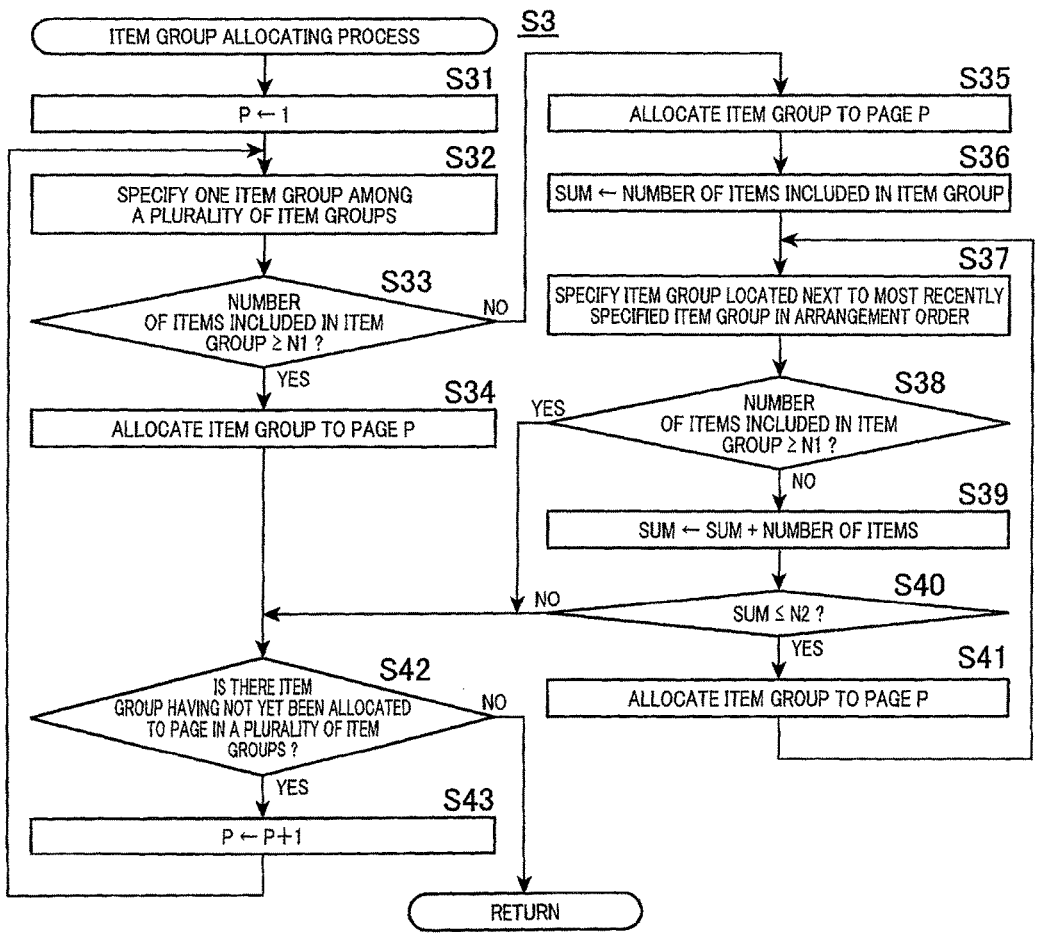

FIG. 6A

(A-1) ITEM GROUP CLASSIFICATION RESULT

| ITEM GROUP NAME | CLASSIFICATION CRITERION CORRESPONDING TO PRICE | HITS |
|---|---|---|
| PRICE RANGE 1 | 1,000 YEN ~ 1,199 YEN | 13 HITS |
| PRICE RANGE 2 | 1,200 YEN ~ 1,399 YEN | 9 HITS |
| PRICE RANGE 3 | 1,400 YEN ~ 1,599 YEN | 11 HITS |
| PRICE RANGE 4 | 1,600 YEN ~ 1,799 YEN | 5 HITS |
| PRICE RANGE 5 | 1,800 YEN ~ 1,999 YEN | 5 HITS |
| PRICE RANGE 6 | 2,000 YEN ~ 2,199 YEN | 12 HITS |
| PRICE RANGE 7 | 2,200 YEN ~ 2,399 YEN | 8 HITS |
| PRICE RANGE 8 | 2,400 YEN ~ 2,599 YEN | 16 HITS |
| PRICE RANGE 9 | 2,600 YEN ~ 2,799 YEN | 8 HITS |
| PRICE RANGE 10 | 2,800 YEN ~ 2,999 YEN | 9 HITS |
| PRICE RANGE 11 | 3,000 YEN ~ 3,199 YEN | 4 HITS |
| PRICE RANGE 12 | 3,200 YEN ~ | 6 HITS |

⇨

(A-2) ITEM GROUP ALLOCATION RESULT (IN THE CASE OF N1=10 and N2=10)

| PAGE NAME | ALLOCATED ITEM GROUP | HITS |
|---|---|---|
| PAGE 1 | PRICE RANGE 1 | 13 HITS |
| PAGE 2 | PRICE RANGE 2 | 9 HITS |
| PAGE 3 | PRICE RANGE 3 | 11 HITS |
| PAGE 4 | PRICE RANGE 4 & PRICE RANGE 5 | 10 HITS |
| PAGE 5 | PRICE RANGE 6 | 12 HITS |
| PAGE 6 | PRICE RANGE 7 | 8 HITS |
| PAGE 7 | PRICE RANGE 8 | 16 HITS |
| PAGE 8 | PRICE RANGE 9 | 8 HITS |
| PAGE 9 | PRICE RANGE 10 | 9 HITS |
| PAGE 10 | PRICE RANGE 11 & PRICE RANGE 12 | 10 HITS |

(A-3) ITEM GROUP ALLOCATION RESULT (IN THE CASE OF N1=10 and N2=20)

| PAGE NAME | ALLOCATED ITEM GROUP | HITS |
|---|---|---|
| PAGE 1 | PRICE RANGE 1 | 13 HITS |
| PAGE 2 | PRICE RANGE 2 | 9 HITS |
| PAGE 3 | PRICE RANGE 3 | 11 HITS |
| PAGE 4 | PRICE RANGE 4 & PRICE RANGE 5 | 10 HITS |
| PAGE 5 | PRICE RANGE 6 | 12 HITS |
| PAGE 6 | PRICE RANGE 7 | 8 HITS |
| PAGE 7 | PRICE RANGE 8 | 16 HITS |
| PAGE 8 | PRICE RANGE 9 & PRICE RANGE 10 | 17 HITS |
| PAGE 9 | PRICE RANGE 11 & PRICE RANGE 12 | 10 HITS |

FIG. 6B

(B-1) ITEM GROUP CLASSIFICATION RESULT

| ITEM GROUP NAME | CLASSIFICATION CRITERION CORRESPONDING TO EVALUATION | HITS |
|---|---|---|
| EVALUATION RANGE 1 | 1.00 OR LOWER | 8 HITS |
| EVALUATION RANGE 2 | 1.01 ~ 1.50 | 9 HITS |
| EVALUATION RANGE 3 | 1.51 ~ 2.00 | 11 HITS |
| EVALUATION RANGE 4 | 2.01 ~ 2.50 | 13 HITS |
| EVALUATION RANGE 5 | 2.51 ~ 3.00 | 7 HITS |
| EVALUATION RANGE 6 | 3.01 ~ 3.50 | 12 HITS |
| EVALUATION RANGE 7 | 3.51 ~ 4.00 | 8 HITS |
| EVALUATION RANGE 8 | 4.01 ~ 4.50 | 14 HITS |
| EVALUATION RANGE 9 | 4.51 ~ 5.00 | 18 HITS |

⇨

(B-2) ITEM GROUP ALLOCATION RESULT (IN THE CASE OF N1=10 and N2=10)

| PAGE NAME | ALLOCATED ITEM GROUP | HITS |
|---|---|---|
| PAGE 1 | EVALUATION RANGE 1 | 8 HITS |
| PAGE 2 | EVALUATION RANGE 2 | 9 HITS |
| PAGE 3 | EVALUATION RANGE 3 | 11 HITS |
| PAGE 4 | EVALUATION RANGE 4 | 13 HITS |
| PAGE 5 | EVALUATION RANGE 5 | 7 HITS |
| PAGE 6 | EVALUATION RANGE 6 | 12 HITS |
| PAGE 7 | EVALUATION RANGE 7 | 8 HITS |
| PAGE 8 | EVALUATION RANGE 8 | 14 HITS |
| PAGE 9 | EVALUATION RANGE 9 | 18 HITS |

(B-3) ITEM GROUP ALLOCATION RESULT (IN THE CASE OF N1=10 and N2=20)

| PAGE NAME | ALLOCATED ITEM GROUP | HITS |
|---|---|---|
| PAGE 1 | EVALUATION RANGE 1 & EVALUATION RANGE 2 | 17 HITS |
| PAGE 2 | EVALUATION RANGE 3 | 11 HITS |
| PAGE 3 | EVALUATION RANGE 4 | 13 HITS |
| PAGE 4 | EVALUATION RANGE 5 | 7 HITS |
| PAGE 5 | EVALUATION RANGE 6 | 12 HITS |
| PAGE 6 | EVALUATION RANGE 7 | 8 HITS |
| PAGE 7 | EVALUATION RANGE 8 | 14 HITS |
| PAGE 8 | EVALUATION RANGE 9 | 18 HITS |

FIG. 6C

(C-1) ITEM GROUP CLASSIFICATION RESULT

| ITEM GROUP NAME | CLASSIFICATION CRITERION CORRESPONDING TO GENRE | HITS |
|---|---|---|
| GENRE 1 | L4-1: CARDIGAN | 7 HITS |
| GENRE 2 | L4-2: HOODIE | 9 HITS |
| GENRE 3 | L4-3: CUTSEW (JERSEY BLOUSE OR DRESS SHIRT) | 11 HITS |
| GENRE 4 | L4-4: VEST | 2 HITS |
| GENRE 5 | L4-5: KNIT | 52 HITS |
| GENRE 6 | L4-6: T-SHIRT | 12 HITS |
| GENRE 7 | L4-7: POLO SHIRT | 7 HITS |

⇨

(C-2) ITEM GROUP ALLOCATION RESULT (IN THE CASE OF N1=10 and N2=10)

| PAGE NAME | ALLOCATED ITEM GROUP | HITS |
|---|---|---|
| PAGE 1 | GENRE 1 | 7 HITS |
| PAGE 2 | GENRE 2 | 9 HITS |
| PAGE 3 | GENRE 3 | 11 HITS |
| PAGE 4 | GENRE 4 | 2 HITS |
| PAGE 5 | GENRE 5 | 52 HITS |
| PAGE 6 | GENRE 6 | 12 HITS |
| PAGE 7 | GENRE 7 | 7 HITS |

(C-3) ITEM GROUP ALLOCATION RESULT (IN THE CASE OF N1=10 and N2=20)

| PAGE NAME | ALLOCATED ITEM GROUP | HITS |
|---|---|---|
| PAGE 1 | GENRE 1 & GENRE 2 | 16 HITS |
| PAGE 2 | GENRE 3 | 11 HITS |
| PAGE 3 | GENRE 4 | 2 HITS |
| PAGE 4 | GENRE 5 | 52 HITS |
| PAGE 5 | GENRE 6 | 12 HITS |
| PAGE 6 | GENRE 7 | 7 HITS |

FIG. 8A

ITEM GROUP CLASSIFICATION RESULT

| ITEM GROUP NAME | CLASSIFICATION CRITERION CORRESPONDING TO PRICE | HITS |
|---|---|---|
| PRICE RANGE 1 | 1,000 YEN ~ 1,199 YEN | 13 HITS |
| PRICE RANGE 2 | 1,200 YEN ~ 1,399 YEN | 9 HITS |
| PRICE RANGE 3 | 1,400 YEN ~ 1,599 YEN | 11 HITS |
| PRICE RANGE 4 | 1,600 YEN ~ 1,799 YEN | 5 HITS |
| PRICE RANGE 5 | 1,800 YEN ~ 1,999 YEN | 5 HITS |
| PRICE RANGE 6 | 2,000 YEN ~ 2,199 YEN | 12 HITS |
| PRICE RANGE 7 | 2,200 YEN ~ 2,399 YEN | 8 HITS |
| PRICE RANGE 8 | 2,400 YEN ~ 2,599 YEN | 16 HITS |
| PRICE RANGE 9 | 2,600 YEN ~ 2,799 YEN | 8 HITS |
| PRICE RANGE 10 | 2,800 YEN ~ 2,999 YEN | 9 HITS |
| PRICE RANGE 11 | 3,000 YEN ~ 3,199 YEN | 4 HITS |
| PRICE RANGE 12 | 3,200 YEN ~ | 6 HITS |

(A-1)

ITEM GROUP ALLOCATION RESULT (IN THE CASE OF N1=10 and N2=10)

| PAGE NAME | ALLOCATED ITEM GROUP | HITS |
|---|---|---|
| PAGE 1 | PRICE RANGE 1 | 13 HITS |
| PAGE 2 | PRICE RANGE 2 | 9 HITS |
| PAGE 3 | PRICE RANGE 3 | 11 HITS |
| PAGE 4 | PRICE RANGE 4 & PRICE RANGE 11 | 9 HITS |
| PAGE 5 | PRICE RANGE 5 | 5 HITS |
| PAGE 6 | PRICE RANGE 6 | 12 HITS |
| PAGE 7 | PRICE RANGE 7 | 8 HITS |
| PAGE 8 | PRICE RANGE 8 | 16 HITS |
| PAGE 9 | PRICE RANGE 9 | 8 HITS |
| PAGE 10 | PRICE RANGE 10 | 9 HITS |
| PAGE 11 | PRICE RANGE 12 | 6 HITS |

(A-2)

ITEM GROUP ALLOCATION RESULT (IN THE CASE OF N1=10 and N2=20)

| PAGE NAME | ALLOCATED ITEM GROUP | HITS |
|---|---|---|
| PAGE 1 | PRICE RANGE 1 | 13 HITS |
| PAGE 2 | PRICE RANGE 2 & PRICE RANGE 4 & PRICE RANGE 11 | 18 HITS |
| PAGE 3 | PRICE RANGE 3 | 11 HITS |
| PAGE 4 | PRICE RANGE 5 & PRICE RANGE 7 & PRICE RANGE 12 | 19 HITS |
| PAGE 5 | PRICE RANGE 6 | 12 HITS |
| PAGE 6 | PRICE RANGE 8 | 16 HITS |
| PAGE 7 | PRICE RANGE 9 & PRICE RANGE 10 | 17 HITS |

ITEM GROUP CLASSIFICATION RESULT

| ITEM GROUP NAME | CLASSIFICATION CRITERION CORRESPONDING TO EVALUATION | HITS |
|---|---|---|
| EVALUATION RANGE 1 | 1.00 OR LOWER | 8 HITS |
| EVALUATION RANGE 2 | 1.01 ~ 1.50 | 9 HITS |
| EVALUATION RANGE 3 | 1.51 ~ 2.00 | 11 HITS |
| EVALUATION RANGE 4 | 2.01 ~ 2.50 | 13 HITS |
| EVALUATION RANGE 5 | 2.51 ~ 3.00 | 7 HITS |
| EVALUATION RANGE 6 | 3.01 ~ 3.50 | 12 HITS |
| EVALUATION RANGE 7 | 3.51 ~ 4.00 | 8 HITS |
| EVALUATION RANGE 8 | 4.01 ~ 4.50 | 14 HITS |
| EVALUATION RANGE 9 | 4.51 ~ 5.00 | 18 HITS |

(B-1)

ITEM GROUP ALLOCATION RESULT (IN THE CASE OF N1=10 and N2=10)

| PAGE NAME | ALLOCATED ITEM GROUP | HITS |
|---|---|---|
| PAGE 1 | EVALUATION RANGE 1 | 8 HITS |
| PAGE 2 | EVALUATION RANGE 2 | 9 HITS |
| PAGE 3 | EVALUATION RANGE 3 | 11 HITS |
| PAGE 4 | EVALUATION RANGE 4 | 13 HITS |
| PAGE 5 | EVALUATION RANGE 5 | 7 HITS |
| PAGE 6 | EVALUATION RANGE 6 | 12 HITS |
| PAGE 7 | EVALUATION RANGE 7 | 8 HITS |
| PAGE 8 | EVALUATION RANGE 8 | 14 HITS |
| PAGE 9 | EVALUATION RANGE 9 | 18 HITS |

(B-2)

ITEM GROUP ALLOCATION RESULT (IN THE CASE OF N1=10 and N2=20)

| PAGE NAME | ALLOCATED ITEM GROUP | HITS |
|---|---|---|
| PAGE 1 | EVALUATION RANGE 1 & EVALUATION RANGE 5 | 15 HITS |
| PAGE 2 | EVALUATION RANGE 2 & EVALUATION RANGE 7 | 17 HITS |
| PAGE 3 | EVALUATION RANGE 3 | 11 HITS |
| PAGE 4 | EVALUATION RANGE 4 | 13 HITS |
| PAGE 5 | EVALUATION RANGE 6 | 12 HITS |
| PAGE 6 | EVALUATION RANGE 8 | 14 HITS |
| PAGE 7 | EVALUATION RANGE 9 | 18 HITS |

ITEM GROUP CLASSIFICATION RESULT

| ITEM GROUP NAME | CLASSIFICATION CRITERION CORRESPONDING TO GENRE | HITS |
|---|---|---|
| GENRE 1 | L4-1: CARDIGAN | 7 HITS |
| GENRE 2 | L4-2: HOODIE | 9 HITS |
| GENRE 3 | L4-3: CUTSEW (JERSEY BLOUSE OR DRESS SHIRT) | 11 HITS |
| GENRE 4 | L4-4: VEST | 2 HITS |
| GENRE 5 | L4-5: KNIT | 52 HITS |
| GENRE 6 | L4-6: T-SHIRT | 12 HITS |
| GENRE 7 | L4-7: POLO SHIRT | 7 HITS |

(C-1)

ITEM GROUP ALLOCATION RESULT (IN THE CASE OF N1=10 and N2=10)

| PAGE NAME | ALLOCATED ITEM GROUP | HITS |
|---|---|---|
| PAGE 1 | GENRE 1 & GENRE 4 | 9 HITS |
| PAGE 2 | GENRE 2 | 9 HITS |
| PAGE 3 | GENRE 3 | 11 HITS |
| PAGE 4 | GENRE 5 | 52 HITS |
| PAGE 5 | GENRE 6 | 12 HITS |
| PAGE 6 | GENRE 7 | 7 HITS |

(C-2)

ITEM GROUP ALLOCATION RESULT (IN THE CASE OF N1=10 and N2=20)

| PAGE NAME | ALLOCATED ITEM GROUP | HITS |
|---|---|---|
| PAGE 1 | GENRE 1 & GENRE 4 & GENRE 7 | 16 HITS |
| PAGE 2 | GENRE 2 & GENRE 3 | 20 HITS |
| PAGE 3 | GENRE 5 | 52 HITS |
| PAGE 4 | GENRE 6 | 12 HITS |

DISPLAY SCREEN

| ARRANGEMENT ORDER : STANDARD | LOWEST PRICE FIRST | HIGHEST EVALUATION FIRST | GENRE ORDER | DATE OF RELEASE ORDER |

1ST HIT TO 13TH HITS (106 HITS IN TOTAL) NEXT PAGE   1 | 2 | 3 | 4 | 5 | 6 | 7 | 8 | 9 | 10

| ITEM IMAGE | ITEM NAME AND ITEM DESCRIPTION | ITEM PRICE |
|---|---|---|
|  | ITEM AAA ········ | 1,000 YEN |
|  | ITEM BBB ········ | 1,050 YEN |
|  | ITEM CCC ········ | 1,100 YEN |
|  | ITEM DDD ········ | 1,120 YEN |
|  | ITEM EEE ········ | 1,125 YEN |
|  | ITEM FFF ········ | 1,150 YEN |
|  | ITEM GGG ········ | 1,150 YEN |
|  | ITEM HHH ········ | 1,170 YEN |
|  | ITEM III ········ | 1,180 YEN |
|  | ITEM JJJ ········ | 1,185 YEN |
|  | ITEM KKK ········ | 1,190 YEN |
|  | ITEM LLL ········ | 1,195 YEN |
|  | ITEM MMM ········ | 1,197 YEN |

PAGE

FIG.10

DISPLAY SCREEN

| ITEM IMAGE | ITEM NAME AND ITEM DESCRIPTION | ITEM PRICE |
|---|---|---|
| | ITEM NNN ········ | 1,200 YEN |
| | ITEM OOO ········ | 1,210 YEN |
| | ITEM PPP ········ | 1,250 YEN |
| | ITEM QQQ ········ | 1,260 YEN |
| | ITEM RRR ········ | 1,270 YEN |
| | ITEM SSS ········ | 1,300 YEN |
| | ITEM TTT ········ | 1,330 YEN |
| | ITEM UUU ········ | 1,350 YEN |
| | ITEM VVV ········ | 1,380 YEN |

ARRANGEMENT ORDER : STANDARD | LOWEST PRICE FIRST | HIGHEST EVALUATION FIRST | GENRE ORDER | DATE OF RELEASE ORDER

14TH HIT TO 22ND HITS (106 HITS IN TOTAL) NEXT PAGE   1 | 2 | 3 | 4 | 5 | 6 | 7 | 8 | 9 | 10

PAGE

FIG.12A

ITEM GROUP CLASSIFICATION RESULT

| ITEM GROUP NAME | CLASSIFICATION CRITERION CORRESPONDING TO GENRE | HITS |
|---|---|---|
| GENRE 1 | L4-1: CARDIGAN | 7 HITS |
| GENRE 2 | L4-2: HOODIE | 9 HITS |
| GENRE 3 | L4-3: CUTSEW (JERSEY BLOUSE OR DRESS SHIRT) | 11 HITS |
| GENRE 4 | L4-4: VEST | 2 HITS |
| GENRE 5 | L4-5: KNIT | 52 HITS |
| GENRE 6 | L4-6: T-SHIRT | 12 HITS |
| GENRE 7 | L4-7: POLO SHIRT | 7 HITS |

FIG.12B

ITEM GROUP CLASSIFICATION RESULT

| ITEM GROUP NAME | CLASSIFICATION CRITERION CORRESPONDING TO GENRE | NEW CLASSIFICATION CRITERION CORRESPONDING TO GENRE | HITS |
|---|---|---|---|
| GENRE 1 | L4-1: CARDIGAN | — | 7 HITS |
| GENRE 2 | L4-2: HOODIE | — | 9 HITS |
| GENRE 3 | L4-3: CUTSEW (JERSEY BLOUSE OR DRESS SHIRT) | — | 11 HITS |
| GENRE 4 | L4-4: VEST | — | 2 HITS |
| GENRE 5 | L4-5: KNIT | L5-1: V-NECK | 21 HITS |
| GENRE 6 | | L5-2: CREW NECK | 8 HITS |
| GENRE 7 | | L5-3: TURTLE NECK | 7 HITS |
| GENRE 8 | | L5-4: OTHERS | 16 HITS |
| GENRE 9 | L4-6: T-SHIRT | — | 12 HITS |
| GENRE 10 | L4-7: POLO SHIRT | — | 7 HITS |

INFORMATION PROCESSING APPARATUS, INFORMATION PROCESSING METHOD, INFORMATION PROCESSING PROGRAM, AND RECORDING MEDIUM STORING THEREON INFORMATION PROCESSING PROGRAM WHICH CLASSIFIES AND DISPLAYS A PLURALITY OF ELEMENTS CONSTITUTING A LIST ON A PLURALITY OF PAGES

TECHNICAL FIELD

The present invention relates to the technical field of information processing apparatuses and the like that classifies and displays elements constituting a list in a plurality of web pages.

BACKGROUND ART

Conventionally there has been known an information presentation method of presenting a plurality of elements, such as information retrieved based on search conditions or information registered in a registration list such as a user's favorite (bookmark), on a web page in a list form. When such a list includes a large number of elements, the browsing property is impaired if all elements are posted in one page. Therefore, the page is generally split after a predetermined numbers (for example, twenty) of elements are shown. In this case, users browse respective elements while switching between pages appropriately. Patent Literature 1 discloses a technique for displaying respective pieces of information as symbol images in order to solve a problem that it takes a lot of time to find necessary information among retrieval results while switching between pages.

PRIOR ART LITERATURE

Patent Literature

Patent Literature 1: JP 2004-145631 A

SUMMARY OF THE INVENTION

Problem to be Solved by the Invention

However, if the page is split after a predetermined numbers of elements as in the conventional technique, elements which are likely to be compared to each other are presented in different pages, which may cause inconvenience.

Therefore, the present invention has been made in view of the above problem and is directed to provide an information processing apparatus, an information processing method, an information processing program, and a recording medium having stored therein the information processing program, which are capable of dividing and displaying a number of elements on a plurality of pages while maintaining the property that it is easy to compare elements to each other.

Means for Solving the Problem

In order to solve the above problem, the invention according to claim 1 is an information processing apparatus, which classifies and displays a plurality of elements constituting a list on a plurality of pages,
the information processing apparatus, comprising:
a determining means that classifies the plurality of elements, based on a classification criterion which is different from a classification criterion corresponding to a limit number of elements to be displayed per page and which corresponds to an attribute of the element, to determine a plurality of element groups; and
an allocating means that allocates the plurality of element groups determined by the determining means to a plurality of pages, the allocating means allocating the respective element groups to any one of the plurality of pages so that all elements included in one element group are displayed on the same page.

According to the present invention, it is possible to divide and display a number of elements on a plurality of pages while maintaining the property that it is easy to compare elements to each other.

The invention according to claim 2 is the information processing apparatus according to claim 1,
wherein the allocating means allocates all elements included in each of the plurality of element groups to the same page so that the number of elements displayed on the same page falls within a predetermined range based on the limit number of elements to be displayed.

According to the present invention, it is possible to reduce the unevenness in the numbers of elements displayed on the respective pages while maintaining the property that it is easy to compare elements to each other.

The invention according to claim 3 is the information processing apparatus according to claim 1,
wherein the determining means specifies an element group that includes less than a first predetermined number of elements from among the plurality of determined element groups, changes the classification criterion so that the number of elements included in the specified element group is the first predetermined number or more, and classifies the plurality of elements based on the changed classification criterion to determine a plurality of element groups.

According to the present invention, it is possible to reduce pages in which a small number of elements are displayed while maintaining the property that it is easy to compare elements to each other. As a result, it is possible to reduce a communication load and a system load.

The invention according to claim 4 is the information processing apparatus according to claim 1,
wherein the determining means specifies a plurality of element groups that includes less than a first predetermined number of elements from among the plurality of determined element groups, and merges the plurality of specified element groups to determine one element group.

According to the present invention, it is possible to reduce pages in which a small number of elements are displayed while maintaining the property that it is easy to compare elements to each other. As a result, it is possible to reduce a communication load and a system load and to further shorten a processing time.

The invention according to claim 5 is the information processing apparatus according to claim 4,
wherein the determining means specifies a plurality of element groups which are adjacent to each other among the plurality of element groups arranged in a predetermined arrangement order, and merges the plurality of specified element groups.

According to the present invention, it is possible to reduce pages in which a small number of elements are displayed while maintaining the property that it is easy to compare elements to each other. As a result, it is possible to reduce a communication load and a system load and to further shorten a processing time.

The invention according to claim 6 is the information processing apparatus according to claim 1,
wherein the determining means specifies an element group that includes a second predetermined number of elements or more from among the plurality of determined element groups, and classifies a plurality of elements included in the specified element group based on a new classification criterion for the specified element group so that the number of elements included in the specified element group is less than the second predetermined number to determine a plurality of element groups.

According to the present invention, it is possible to reduce pages in which a large number of elements are displayed while maintaining the property that it is easy to compare elements to each other.

The invention according to claim 7 is an information processing method of classifying and displaying a plurality of elements constituting a list on a plurality of pages,
the information processing method, comprising:
a determining step of classifying the plurality of elements based on a classification criterion which is different from a classification criterion corresponding to a limit number of elements to be displayed per page and which corresponds to an attribute of the element to determine a plurality of element groups; and
an allocating step of allocating the plurality of element groups determined by the determining means to a plurality of pages, the step allocating the respective element groups to any one of the plurality of pages so that all elements included in one element group are displayed on the same page.

The invention according to claim 8 is an information processing program for causing a computer, which classifies and displays a plurality of elements constituting a list on a plurality of pages, to function as:
a determining means that classifies the plurality of elements based on a classification criterion which is different from a classification criterion corresponding to a limit number of elements to be displayed per page and which corresponds to an attribute of the element to determine a plurality of element groups; and
an allocating means that allocates the plurality of element groups determined by the determining means to a plurality of pages, the allocating means allocating the respective element groups to any one of the plurality of pages so that all elements included in one element group are displayed on the same page.

The invention according to claim 9 is a recording medium storing thereon a computer-readable information processing program for causing a computer, which classifies and displays a plurality of elements constituting a list on a plurality of pages, to function as:
a determining means that classifies the plurality of elements based on a classification criterion which is different from a classification criterion corresponding to a limit number of elements to be displayed per page and which corresponds to an attribute of the element to determine a plurality of element groups; and
an allocating means that allocates the plurality of element groups determined by the determining means to a plurality of pages, the allocating means allocating the respective element groups to any one of the plurality of pages so that all elements included in one element group are displayed on the same page.

Advantageous Effects of the Invention

According to the present invention, a plurality of element groups is determined based on a classification criterion covering respective attributes of elements that constitute a list, and the respective element groups are allocated to any one of a plurality of pages so that all elements included in each of the plurality of element groups are displayed on the same page. Thus, it is possible to divide and display a number of elements on a plurality of pages while maintaining the property that it is easy to compare elements to each other.

BRIEF DESCRIPTION OF THE DRAWINGS

FIGS. 3A to 3G are diagrams illustrating examples of entries to be recorded in databases.

FIG. 4 is a diagram illustrating an example of a page displayed on a display screen of a user terminal 3.

FIG. 5A is a flowchart illustrating an example of a sorting process of a system control unit 14, and FIG. 5B is a flowchart illustrating an example of an "allocating process" of reducing pages in which a small number of items are displayed.

FIGS. 6A to 6C are diagrams illustrating the way in which a plurality of items constituting an item list are classified into a plurality of item groups and are allocated to respective pages by the allocating process illustrated in FIG. 5B.

FIGS. 8A to 8C are diagrams illustrating the way in which a plurality of items constituting an item list are classified into a plurality of item groups and are allocated to respective pages by the allocating process illustrated in FIG. 7.

FIG. 9 is a diagram illustrating an example of Page 1 displayed on a display screen of a user terminal 3.

FIG. 10 is a diagram illustrating an example of Page 2 displayed on the display screen of the user terminal 3.

FIGS. 12A and 12B are diagrams illustrating an example of the result in which a plurality of items constituting an item list is classified into a plurality of item groups according to Application Example 2.

MODE FOR CARRYING OUT THE INVENTION

Hereinafter, embodiments of the present invention will be described in detail with reference to the drawings. Also, the embodiments described below are those in a case where the present invention is applied to an information providing system.

[1. Overview of Configuration and Function of Information Providing System]

Figure 1:
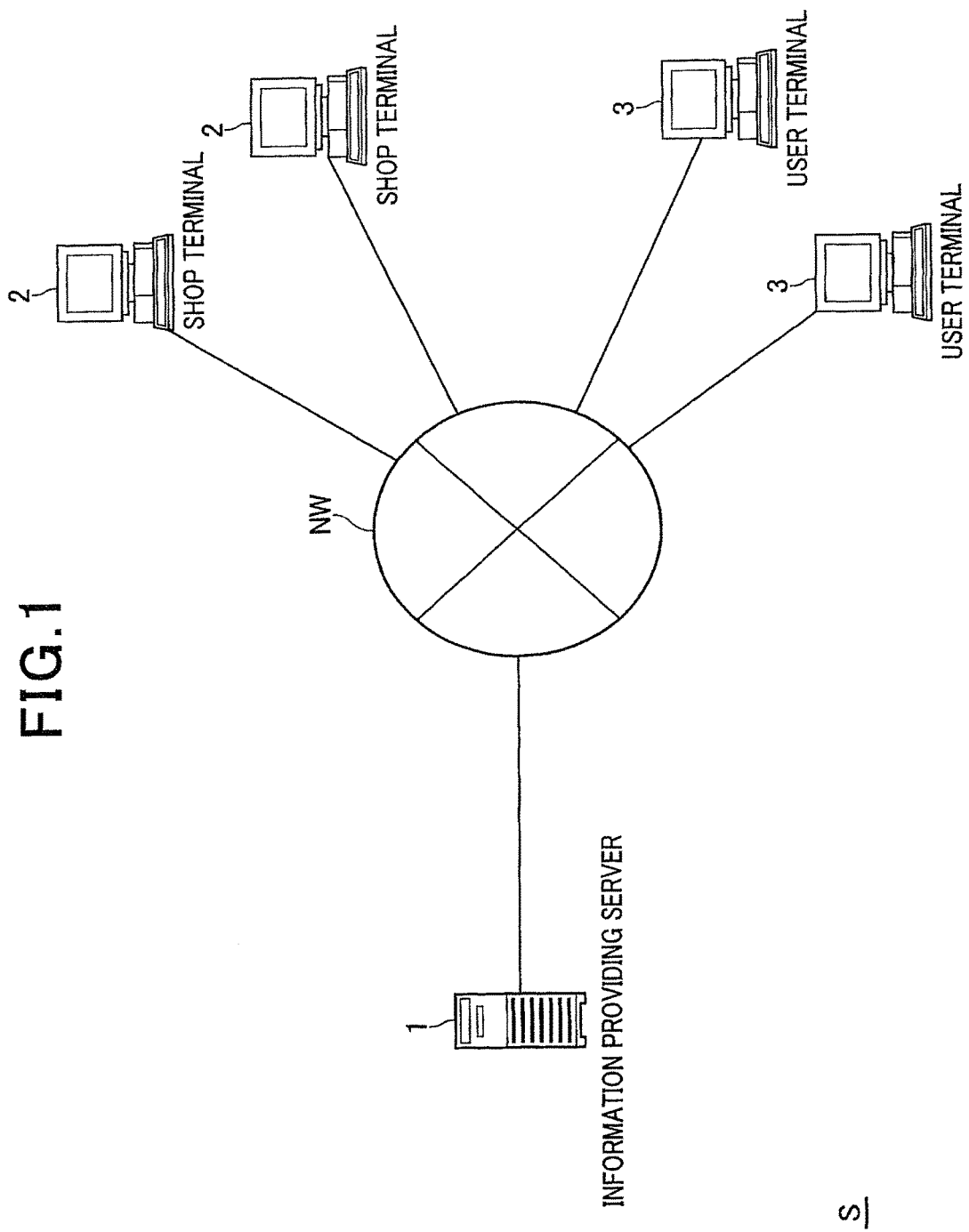
FIG. 1 is a diagram illustrating an example of a schematic configuration of an information providing system S according to an embodiment of the present invention.

First, the configuration of an information providing system S according to an embodiment of the present embodiment will be described with reference to FIG. 1. FIG. 1 is a diagram illustrating an example of a schematic configuration of the information providing system S according to the present embodiment. As illustrated in FIG. 1, the information providing system S is configured to include an information providing server 1, a plurality of shop terminals 2, and a plurality of user terminals 3. The information providing server 1, the respective shop terminals 2, and the respective user terminals 3 are capable of mutually transmitting and receiving data through a network NW by using, for example, TCP/IP as a communication protocol. Also, the network NW is constructed by, for example, Internet, a dedicated communication line (for example, a community antenna television (CATV) line), a mobile communication network (including a base station and the like), and a gateway.

The information providing server 1 (example of an information processing apparatus of the present invention) is a server apparatus that performs a variety of processes associated with an online mall or an Internet auction where users can buy and sell items. Users can purchase desired items from desired shops by using the online mall. Users can also auction items and make a bid for an item being auctioned. Moreover, the information providing server 1 transmits a web page that posts an item list or the like, for example, to the user terminal 3 in response to a request from the user terminal 3 and displays the web page. In this case, the information providing server 1 classifies a plurality of elements constituting an item list or the like into a plurality of web pages and displays the web pages to the user terminal 3.

The shop terminal 2 is a terminal device used by an employee or the like of a shop that is open at an online mall. The shop terminal 2 is used, for example, for registering information on items to be sold on an online mall and checking the entries of an order of an item. Moreover, the shop terminal 2 accesses the information providing server 1 based on an operation of the employee or the like to receive a web page from the information providing server 1 and display the web page. Software such as a browser or an email client is incorporated into the shop terminal 2. A personal computer or the like, for example, is used as the shop terminal 2.

The user terminal 3 is a terminal device of a user who uses an online mall or an auction. The user terminal 3 accesses the information providing server 1 based on an operation of a user to receive a web page from the information providing server 1 and display the web page. Software such as a browser or an email client is incorporated into the user terminal 3. A personal computer, a mobile information terminal such as a personal digital assistant (PDA) or a smartphone, a mobile phone, a mobile game machine, or the like, for example, is used as the user terminal 3.

Figure 2:
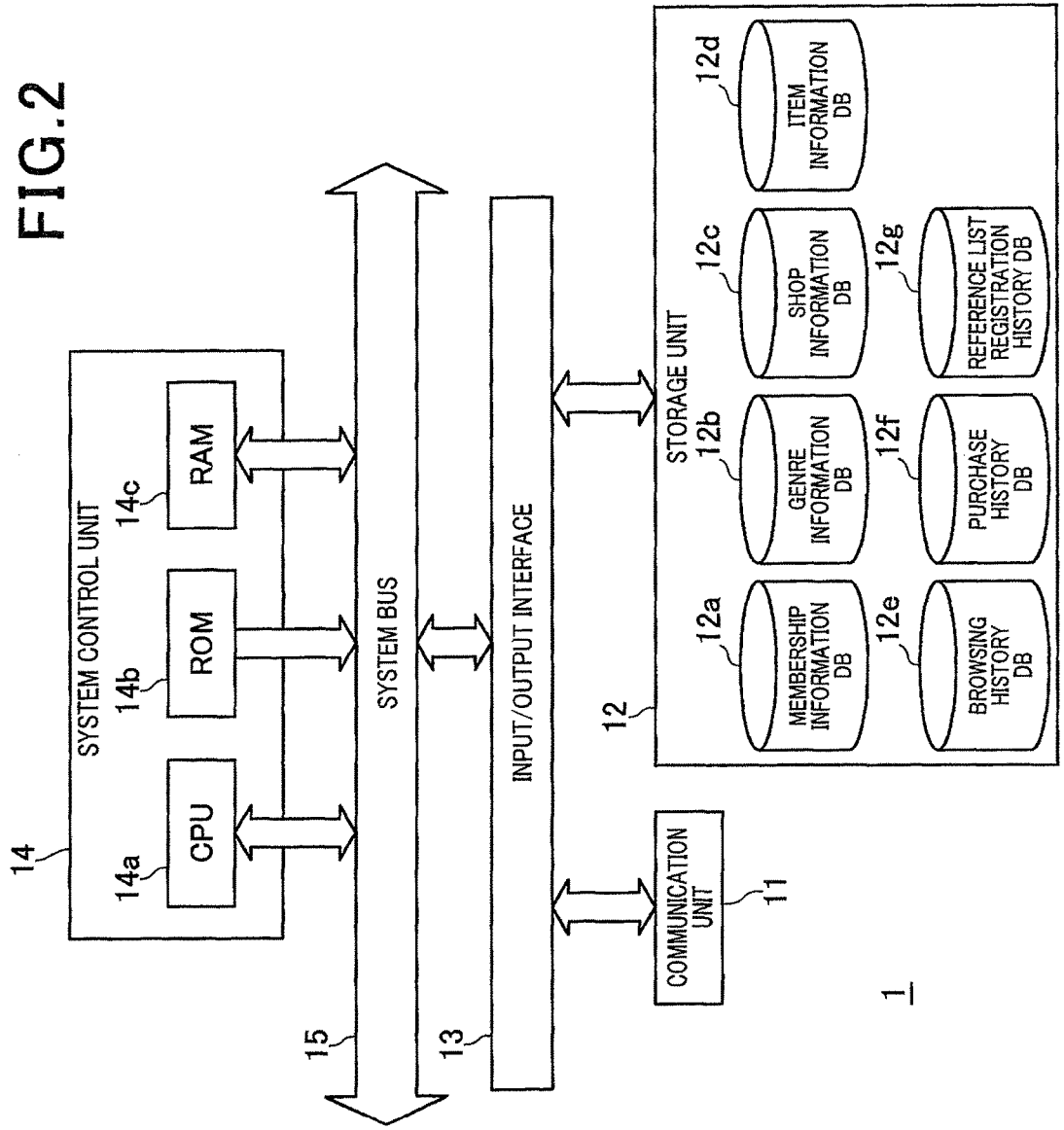
FIG. 2 is a block diagram illustrating an example of a schematic configuration of an information providing server 1 according to the embodiment.

Next, the configuration of the information providing server 1 will be described with reference to FIG. 2 and FIGS. 3A to 3G. FIG. 2 is a block diagram illustrating an example of a schematic configuration of the information providing server 1 according to the present embodiment. FIGS. 3A to 3G are diagrams illustrating examples of entries to be recorded in databases. As illustrated in FIG. 2, the information providing server 1 includes a communication unit 11, a storage unit 12, an input/output interface 13, and a system control unit 14. The system control unit 14 and the input/output interface 13 are connected via a system bus 15. Note that the information providing server 1 may be configured as a plurality of server apparatuses such as a web server, an application server, and a database server, and theses servers may be connected by LAN or the like.

The communication unit 11 is configured to connect to the network NW to control the state of communication with the shop terminal 2, the user terminal 3, and the like.

The storage unit 12 is configured to include, for example, a hard disk drive. The storage unit 12 stores structured document files (for example, hypertext markup language (HTML) or XHTML documents), image data, and the like that constitute the web page displayed on the user terminal 3.

Databases, such as a membership information database (DB) 12a, a genre information DB 12b, a shop information DB 12c, an item information DB 12d, a browsing history DB 12e, a purchase history DB 12f, a reference list registration history DB 12g, are established in the storage unit 12. All or some of these DBs may be provided in a storing means of a predetermined server that the information providing server 1 can access.

FIG. 3A is a diagram illustrating an example of entries recorded in the membership information DB 12a. Membership information of users registered as members is recorded in the membership information DB 12a. Specifically, information such as a user ID, a password, a nickname, a name, a date of birth, a gender, a zip code, an address, a telephone number, and an email address is registered in the membership information DB 12a in association with each user. Herein, the user ID is identification information unique to each user. The user ID and the password are authentication information used in a login process (user authentication process).

FIG. 3B is a diagram illustrating an example of entries recorded in the genre information DB 12b. Genre information on the genre of an item is recorded in the genre information DB 12b. Specifically, information such as a genre ID, a genre name, a genre level, a parent genre ID, and a child genre ID list is recorded in the genre information DB 12b in association with each genre. Herein, the genre information is set by, for example, an administrator or the like of an online mall. The genre ID is identification information unique to each genre. Genres of items are defined hierarchically by a tree structure, and each node of the tree structure corresponds to a genre. The depth of a node corresponds to the level (class) of the genre corresponding to the node. The parent genre ID is a genre ID of a parent genre of a genre defined by genre information. The child genre ID list is a list of genre IDs of child genres of a genre defined by genre information. The child genre ID list is set when a genre defined by genre information has a child genre.

FIG. 3C is a diagram illustrating an example of entries recorded in the shop information DB 12c. Shop information on a shop that is open at an online mall is recorded in the shop information DB 12c. Specifically, information such as a shop ID, a password, a shop name, a zip code, an address, a telephone number, an email address, and a shop evaluation is recorded in the shop information DB 12c in association with each shop. Herein, the shop ID is identification information unique to each shop. The shop ID and the password are authentication information used in a login process. The shop evaluation is represented by, for example, scores of "1 to 5". As the score is higher, the shop is more highly evaluated. The shop evaluation is input (on a web page) by respective users who have purchased items from the shop. Further, when a plurality of users has evaluated the shop, the average of the plurality of evaluations, for example, is used.

FIG. 3D is a diagram illustrating an example of entries recorded in the item information DB 12d. Item information on items auctioned on an online mall is recorded in the item information DB 12d. Specifically, information such as an item ID, a shop ID of a shop that sells the item, an item code, a genre ID of a genre to which the item belongs, an item name, an item description, a price, the date of release, a reward point (point reward percentage), and an item evaluation is recorded in the item information DB 12d in association with each item and each shop. Herein, the item ID is identification information unique to each item, and different item IDs are used if the same items are sold in different shops. The item code is a code number for identifying an item. The item code is, for example, a Japanese Article Number (JAN) code, and the same item code is used for the same items even if they are sold in different shops. The genre ID of a genre to which the item belongs is, for example, a genre ID of each of genres of top level 1 to bottom level 5. The point reward percentage is a percentage of reward points (rewarded to a user who has purchased the item) with respect to the price of the item purchased. For example, if 1 point is rewarded for 1,000 yen, the point reward percentage is 0.1%. The points can be used by a user to pay for items. Thus, the higher the point reward percentage of an item is, the more profitable it is to the user. The item evaluation is represented by scores of "1" to "5," for example, and the higher the score is, the higher the evaluation of the item is. The item evaluation is input (on a web page) by respective users who have purchased the item. Further, when a plurality of users has evaluated the item, the average of the plurality of evaluations, for example, is used.

FIG. 3E is a diagram illustrating an example of entries recorded in the browsing history DB 12e. A browsing history of an item placed in a page (a web page on which item information is posted) that users have browsed is recorded in the browsing history DB 12e. Specifically, information such as a user ID of a user who has browsed the item, a URL of the page browsed, an item ID of an item placed in the page browsed, an item code, an item name, a genre ID, a shop ID of a shop that sells (provides) the item, and a browsing date is recorded in the browsing history DB 12e in association with each user. The browsing history is recorded when a web page is displayed on the user terminal 3 in response to an operation of a logged-in user. Alternatively, a browsing history stored in a web browser of the user terminal 3 may be acquired and recorded by the information providing server 1 during log-in of the user of the user terminal 3.

FIG. 3F is a diagram illustrating an example of entries recorded in the purchase history DB 12f. A purchase history (transaction history) of items purchased by a user is recorded in the purchase history DB 12f. Specifically, information such as a user ID of a user who has purchased an item, an item ID of the item purchased, an item code, an item name, a genre ID, shop ID of a shop (purchase destination shop) that has sold the item, the number of purchases, a purchase price, and a purchase date (an order date) is recorded in the purchase history DB 12f in association with each user. The purchase history is recorded when an item purchase procedure is completed by an operation of a user in a web page for processing the item purchase procedure.

FIG. 3G is a diagram illustrating an example of entries recorded in the reference list registration history DB 12g. A registration history of items (for example, item IDs) that a user has registered in a predetermined reference list is recorded in the reference list registration history DB 12g. Specifically, information such as a user ID of a user who has registered an item in the reference list, an item ID of the item registered in the reference list, an item code, an item name, a genre ID, a shop ID of a shop that sells the item, and a registration date and time is recorded in the reference list registration history DB 12g in association with each user.

Examples of the predetermined reference list include a favorite list, a bookmark list, a shopping cart list, a watch list, and the like. A user can register a favorite item or an interesting item in such a reference list as a purchase target item or an item to be recommended to other users, for example. The registration history is recorded when an item is registered in a predetermined reference list in response to an operation of a logged-in user.

Moreover, various programs such as an operating system (OS), a world wide web (WWW) server program, a database management system (DBMS), and an information processing program according to the present invention, as well as various types of setting data and tables are stored in the storage unit 12. The programs may be acquired from another server apparatus through the network NW or may be recorded in a recording medium such as a digital versatile disc (DVD) and read by a drive device.

The input/output interface 13 is configured to perform interfacing processes between the communication unit 11 and the storage unit 12, and the system control unit 14.

The system control unit 14 is configured to include a CPU 14a, a read only memory (ROM) 14b, a random access memory (RAM) 14c, and the like. The system control unit 14 is further configured to function as a determining means and an allocating means when the CPU 14a serving as a computer reads and executes various programs (that is, the information processing program of the present invention causes the CPU 14a to execute the means). Specifically, the system control unit 14 classifies a plurality of elements constituting a list displayed on a web page based on a classification criterion which is different from a classification criterion corresponding to the maximum number of elements to be displayed per page constituting the list displayed on the web page and which corresponds to the attribute of the element constituting the list to determine a plurality of element groups. Herein, examples of the elements constituting the list include items or stores retrieved based on search conditions input by a user, items included in a browsing history, items included in a purchase history, and items included in a registration history. Moreover, examples of the element attribute include the price of an item, an evaluation of an item, the genre of an item, the date of release of an item, and a reward point of an item. Further, for example, when the element attribute is the price of an item, the classification criterion corresponding to the item's price is that a plurality of items is classified into respective price ranges of items (in other words, pages are broken into price ranges of items). Further, for example, when the element attribute is the price of an item, the classification criterion corresponding to the item's evaluation is that a plurality of items is classified into respective evaluation ranges of items. Further, for example, when the element attribute is the genre of an item, the classification criterion corresponding to the item's genre is that a plurality of items is classified into respective genres of items. In this manner, when three element groups 1 to 3 are determined based on the classification criterion corresponding to the element attribute, for example, the numbers of elements (hits) included in respective element groups may become uneven such that ten elements are included in the element group 1, nine elements are included in the element group 2, and five elements are included in the element group 3. However, elements which are likely to be compared to each other can be included in the same element group.

The system control unit 14 allocates the plurality of determined element groups to a plurality of pages. In this case, the system control unit 14 allocates the respective element groups to any one of the plurality of pages so that all elements included in an element group are displayed on the same page. For example, as described above, when three element groups 1 to 3 are determined, the element group 1 is allocated to Page 1, the element group 2 is allocated to Page 2, and the element group 3 is allocated to Page 3, respectively. Alternatively, the element groups 1 and 2 may be allocated to Page 1, and the element group 3 may be allocated to Page 2, respectively. However, a plurality of elements included in a certain element group is prevented from being displayed across a plurality of pages (i.e. being divided into and posted on different pages).

[2. Operation of Information Providing System]

Next, the operation of the information providing system S will be described. In the following description, it is assumed that the user terminal 3 transmits a page request to the information providing server 1 using a web browser and consequently displays a web page (hereinafter referred to simply as a "page") acquired from the information providing server 1. FIG. 4 is a diagram illustrating an example of a page displayed on a display screen (an active window screen of a web browser) of the user terminal 3. The page illustrated in FIG. 4 is the first of ten pages. An item list including items (item information) corresponding to "ten hits" set, in advance, as the maximum number of hits to be displayed per page is displayed in each page. In this item list, items are displayed in standard (default) settings, for example, in the order of registration or arrival. The maximum number of hits to be displayed can be freely set by an operation of the user. Moreover, the items constituting the item list are items retrieved by the information providing server 1 based on the search conditions input by the user, for example. Alternatively, when the user of the user terminal 3 is logged into the information providing server 1 through a log-in process of the server, the items constituting the item list may be those registered in a bookmark list, for example. Moreover, page switching (transition) is realized by a select operation of the user of the user terminal 3. For example, when the user clicks using a mouse or touches using a finger on "Next 10 Hits" (or a portion indicating a page number) displayed on the page illustrated in FIG. 4, a hyperlink allows the next page (or a page designated by the page number) to be acquired from the information providing server 1 and be displayed. Page switching may be realized without the entire page being refreshed (i.e. reloaded from the information providing server 1) (that is, the item list region is refreshed) with the aid of Ajax or the like, for example. Moreover, rearrangement keys for sorting (rearranging) the arrangement of items included in the item list (the item list ranging over all pages) are provided in each page. In the example illustrated in FIG. 4, "lowest price first," "highest evaluation first," "genre," and "date of release" are provided as the rearrangement keys. Besides these keys, rearrangement keys such as "highest price first," "lowest evaluation first," "highest (or lowest) grant point first," and the like may be provided.

In the page display state illustrated in FIG. 4, when the user selects the rearrangement key (by clicking it using a mouse or touching it using a finger, for example), a sort request to sort items in the arrangement order corresponding to the rearrangement key is transmitted to the information providing server 1. This sort request includes information indicating the rearrangement key. Upon receiving the sort request from the user terminal 3, the information providing server 1 starts a sorting process.

FIG. 5A is a flowchart illustrating an example of the sorting process of the system control unit 14. In step S1 illustrated in FIG. 5A, the system control unit 14 of the information providing server 1 arranges items constituting the item list in the arrangement order corresponding to the rearrangement key indicated by the received sort request (for example, the item IDs of the items are arranged on the RAM 14c in descending order of prices). Herein, the items constituting the item list are those retrieved based on the search conditions input by the user of the user terminal 3 (the user terminal 3 in active session) having transmitted the sort request or those registered in a bookmark list of the user, for example. During the rearrangement, information indicating the attributes of items recorded in the item information DB 12d is referred to.

The items constituting the item list may be arranged in an arrangement order corresponding to an attribute that the user focuses on. In this case, the attribute that the user focuses on is determined by the system control unit 14 based on the purchase history or the registration history of the user, for example. For example, when the user has a strong tendency to purchase an item of a lower price among a plurality of same items, the attribute that the user focuses on is determined as "price of item". Alternatively, for example, when the user has a strong tendency to purchase an item of a higher evaluation among a plurality of same items, the attribute that the user focuses on is determined as "evaluation of item". Still alternatively, for example, when the user has a strong tendency to purchase an item of a higher grant point among a plurality of same items, the attribute that the user focuses on is determined as "grant point of item". According to such a configuration, the rearrangement key can be set as a default even if the rearrangement key is not selected by the user.

Subsequently, the system control unit 14 executes an item group determining process (step S2). In the determining process, the system control unit 14 classifies a plurality of items constituting the item list based on a classification criterion which is different from the classification criterion corresponding to the maximum number of hits to be displayed (for example, "ten hits") and which corresponds to the attribute of the item constituting the item list to determine a plurality of item groups. That is, in this determining process, the plurality of items constituting the item list is not classified based on the classification criterion corresponding to the maximum number of hits to be displayed, but the plurality of items constituting the item list is classified based on the classification criterion corresponding to the attribute of the item constituting the item list. Serial numbers are assigned to the respective item groups determined in this manner in an arrangement order, for example. Herein, the item attribute is determined from the rearrangement key indicated by the sort request. For example, when the rearrangement key is "lowest price first," "price of item" is determined as the item attribute. Moreover, when the rearrangement key is "highest evaluation first," "evaluation of item" is determined as the item attribute. Moreover, when the rearrangement key is "genre," "genre of item" is determined as the item attribute. The attributes determined in this manner are attributes of the items constituting the item list displayed on the page illustrated in FIG. 4. A plurality of candidates for the classification criterion may be set in advance for each attribute of the item, for example, and a classification criterion used for the process may be selected among the plurality of candidates according to a total number of items included in the item list. Moreover, the attribute of an item may be an attribute that the user focuses on, for example. In this case, since the attribute that the user focuses on is determined based on the purchase history or the registration history of the user by the system control unit 14, for example, the item attribute may not be determined from the rearrangement key. Moreover, the item attribute may be set as a default by a system administrator, for example. In this case, the item attribute is determined regardless of the user's intention.

(A-1) of FIG. 6A, (B-1) of FIG. 6B, and (C-1) of FIG. 6C are diagrams illustrating examples of the results in which a plurality of items constituting an item list is classified into a plurality of item groups. In the example (A-1) of FIG. 6A, a plurality of items constituting an item list is classified based on a classification criterion corresponding to the price of item to determine a plurality of item groups (price ranges 1 to 12). In the example (A-1) of FIG. 6A, a width of each range is set to "200 yen" (that is, item groups change every 200 yen). In the example (B-1) of FIG. 6B, a plurality of items constituting an item list is classified based on a classification criterion corresponding to the evaluation of item to determine a plurality of item groups (evaluation ranges 1 to 9). In the example (B-1) of FIG. 6B, a width of each range is set to "0.5". In the example (C-1) of FIG. 6C, a plurality of items constituting an item list is classified based on a classification criterion corresponding to the genre of item to determine a plurality of item groups (genres 1 to 7). In the example of (C-1) of FIG. 6C, a width of each range is set to a branch number (-1, -2, -3, . . . ) of Level 4 (L4) of the genre. An item group name (including a serial number) is assigned to each of the item groups illustrated in (A-1), (B-1), and (C-1) of FIGS. 6A, 6B, and 6C. Moreover, as illustrated in (A-1), (B-1), and (C-1) of FIGS. 6A, 6B, and 6C, the numbers of items (hits) included in the respective item groups are uneven.

Subsequently, the system control unit 14 executes an allocating process of allocating the plurality of item groups determined in step S2 to a plurality of pages (step S3). In this allocating process, the system control unit 14 allocates the respective item groups to any one of the plurality of pages so that all items included in one item group are displayed on the same page. For example, the system control unit 14 sequentially allocates the respective item groups determined in step S2 in an arrangement order (that is, in the order of serial numbers) starting from Page 1. Information indicating the correlation between respective item groups and allocated pages is maintained by the system control unit 14 during the active session.

For example, the system control unit 14 allocates Pages 1 to 12 to Price Ranges 1 to 12, respectively. In this case, the pages allocated to the respective item groups are different to one another. According to this configuration, since it is only necessary to sequentially allocate pages in the arrangement order of item groups, it is possible to shorten the processing time. However, in this case, since a very small number of items (hits) may be displayed on one page of the item list as in the item group of Price Range 11 illustrated in (A-1) of FIG. 6A, for example, users have to frequently switch between pages. Thus, it is desirable to reduce pages in which a small number of items are displayed.

FIG. 5B is a flowchart illustrating an example of the "allocating process" of reducing pages in which a small number of items are displayed. In the allocating process illustrated in FIG. 5B, first, the system control unit 14 sets P (variable) indicating a page to "1" (step S31). Moreover, the system control unit 14 initializes (sets to "0") SUM (variable) indicating the sum of the numbers of items. Subsequently, the system control unit 14 specifies one item group among the plurality of item groups determined in step S2 (step S32). In step S32, the item group is specified in the arrangement order (in the order of serial numbers).

Subsequently, the system control unit 14 determines whether the number of items included in the item group specified in step S32 is equal to or larger than a first reference number N1 (step S33). The first reference number N1 is set to be equal to the maximum number of hits to be displayed (for example, ten hits), for example. When it is determined that the number of items included in the item group specified in step S32 is equal to or larger than the first reference number N1 (step S33: YES), the system control unit 14 proceeds to step S34. On the other hand, when it is determined that the number of items included in the item group specified in step S32 is not equal to or larger than the first reference number N1 (step S33: NO), the system control unit 14 proceeds to step S35.

In step S34, the system control unit 14 allocates the item group specified in step S32 to Page P and proceeds to step S42. On the other hand, in step S35, the system control unit 14 allocates the item group specified in step S32 to Page P. Subsequently, the system control unit 14 sets the number of items included in the item group specified in step S32 to be equal to the SUM (step S36). Subsequently, the system control unit 14 specifies an item group that is next to the specified item group in the arrangement order (step S37).

Subsequently, the system control unit 14 determines whether the number of items included in the item group specified in step S37 is equal to or larger than the first reference number N1 (step S38). When it is determined that the number of items included in the item group specified in step S37 is equal to or larger than the first reference number N1 (step S38: YES), the system control unit 14 clears (initializes) the SUM and proceeds to step S42. On the other hand, when it is determined that the number of items included in the item group specified in step S37 is not equal to or larger than the first reference number N1 (step S38: NO), the system control unit 14 proceeds to step S39. The flow may proceed from step S37 to step S39 without performing the process of step S38. In this case, in the example (A-3) of FIG. 6A, price ranges 2 and 3 are allocated to the same page. Further, the flow may proceed from step S32 to step S35 without performing the processes of steps S33 and S34. In this case, in the example (A-3) of FIG. 6A, price ranges 6 and 7 are allocated to the same page.

In step S39, the system control unit 14 adds the number of items included in the item group specified in step S37 to the SUM. Subsequently, the system control unit 14 determines whether the SUM added in step S39 is equal to or smaller than a second reference number N2 (step S40). The second reference number N2 is set to a number (for example, 10 or larger) that is equal to or larger than the first reference number N1, for example. When it is determined that the SUM added in step S39 is not equal to or smaller than the second reference number N2 (for example, the SUM exceeds 20 which is the second reference number N2 after the number of items is added in step S39) (step S40: NO), the system control unit 14 clears (initializes) the SUM and proceeds to step S42. On the other hand, when it is determined that the SUM added in step S39 is equal to or smaller than the second reference number N2 (step S40: YES), the system control unit 14 allocates the next item group specified in step S37 to Page P (step S41) and returns to step S37. When the flow returns to step S37 in this way, an item group that is next to the item group specified last time in the arrangement order is specified, and the number of items included in the specified item group is added to the SUM (step S39). According to such a process, the number of items included in each of the item groups specified according to the arrangement order is added to the SUM until the SUM exceeds the second reference number N2. In this manner, all items included in each of the plurality of item groups can be allocated to the same page while the number of items displayed on the same page falls within a predetermined range based on the maximum number of hits to be displayed.

In step S42, the system control unit 14 determines whether an item group that has not been allocated to any page is present in the plurality of item groups determined in step S2. When it is determined that an item group that has not been allocated to any page is present (step S42: YES), the system control unit 14 adds "1" to P that indicates a page (which means the control unit prepares for allocation of the next page) (step S43) and returns to step S32. When the flow returns to step S32 in this way, one item group that has not been allocated to any page is specified among the plurality of item groups determined in step S2, and the processes subsequent to step S33 are performed in the above-described manner. On the other hand, when it is determined that an item group that has not been allocated to any page is not present (that is, all item groups have been allocated to pages) (step S42: NO), the system control unit 14 ends the allocating process illustrated in FIG. 5B and returns to the process illustrated in FIG. 5A.

According to the allocating process illustrated in FIG. 5B, it is possible to reduce pages in which a small number of items are displayed and, as a result, to reduce a communication load and a system load. (A-2) of FIG. 6A, (B-2) of FIG. 6B, and (C-2) of FIG. 6C illustrate item groups allocated to respective pages when both of the first and second reference numbers N1 and N2 are "10". In the example (A-2) of FIG. 6A, one item group is allocated to each of Pages 1 to 3 and each of Pages 5 to 9, whereas two item groups are allocated to each of Pages 4 to 10. In the examples (B-2) and (C-2) of FIGS. 6B and 6C, one item group is allocated to each page. On the other hand, (A-3) of FIG. 6A, (B-3) of FIG. 6B, and (C-3) of FIG. 6C illustrate item groups allocated to respective pages when the first reference number N1 is "10" and the second reference number N2 is "20". In the examples (A-3), (B-3), and (C-3) of FIGS. 6A, 6B, and 6C, a total number of pages is smaller than that of the examples (A-2), (B-2), and (C-2) of FIGS. 6A, 6B, and 6C. As described above, according to the allocating process illustrated in FIG. 5B, it is possible to reduce unevenness in the numbers of items (hits) allocated to respective pages.

Figure 7:
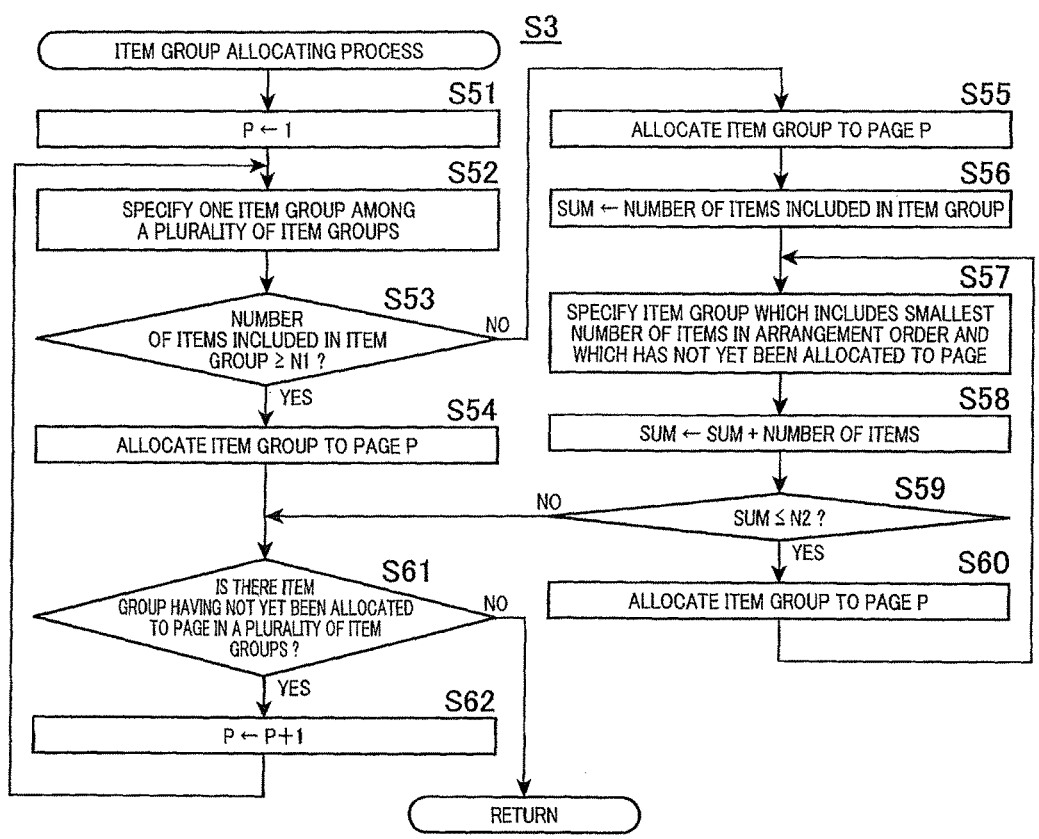
FIG. 7 is a flowchart illustrating an example of the "allocating process" capable of allocating a plurality of item groups to the same page even if the item groups are not adjacent to each other in the arrangement order of item groups.

In the allocating process illustrated in FIG. 5B, a plurality of adjacent item groups is allocated to the same page in the arrangement order of a plurality of item groups (for example, Price Ranges 4 and 5 are allocated to Page 4 as illustrated in (A-2) of FIG. 6A). However, a plurality of item groups may be allocated to the same page according to the arrangement order of item groups even if the item groups are not adjacent to each other in the arrangement order of item groups. FIG. 7 is a flowchart illustrating an example of the "allocating process" capable of allocating a plurality of item groups to the same page even if the item groups are not adjacent to each other in the arrangement order of item groups. FIGS. 8A to 8C are diagrams illustrating the way in which a plurality of items constituting an item list is classified into a plurality of item groups and is allocated to respective pages by the allocating process illustrated in FIG. 7.

Steps S51 to S56 illustrated in FIG. 7 are the same as steps S31 to S36 illustrated in FIG. 3. The flow may proceed from step S52 to step S55 without performing the processes of steps S53 and S54. In step S57, the system control unit 14 specifies item groups which include the smallest number of items in the arrangement order and which have not been allocated to any page. When there is a number of item groups which include the smallest number of items and which have not been allocated to any page, any one of the item groups that are located in the front and the rear in the arrangement order may be specified, for example. In the example (A-3) of FIG. 8A, an item group located in the front in the arrangement order is specified. Alternatively, an item group that includes the next smallest number of items may be specified. Still alternatively, an item group that includes the first reference number N1 of items or more may be excluded from the item groups specified in step S57. Subsequently, the system control unit 14 adds the number of items included in the item group specified in step S57 to the SUM (step S58). Subsequently, the system control unit 14 determines whether the SUM added in step S58 is equal to or smaller than the second reference number N2 (step S59). When it is determined that the SUM added in step S58 is not equal to or smaller than the second reference number N2 (step S59: NO), the system control unit 14 clears (initializes) the SUM and proceeds to step S61. On the other hand, when it is determined that the SUM added in step S58 is equal to or smaller than the second reference number N2 (step S59: YES), the system control unit 14 allocates the next item group specified last time in step S57 to Page P (step S60) and returns to step S57. Steps S61 and S62 illustrated in FIG. 7 are the same as steps S42 and S43 illustrated in FIG. 3. According to the process illustrated in FIG. 7, for example, as illustrated in (A-2) of FIG. 8A, Price Ranges 4 and 11 which are not adjacent to each other among the plurality of item groups can be allocated to the same page. Moreover, according to the process illustrated in FIG. 7, for example, as illustrated in (A-3), (B-3), and (C-3) of FIGS. 8A, 8B, and 8C, it is possible to further reduce the unevenness in the numbers of items allocated to respective pages as compared to (A-3), (B-3), and (C-3) of FIGS. 6A, 6B, and 6C.

Subsequently, in step S4 illustrated in FIG. 5A, the system control unit 14 inserts item information of the items included in the item group allocated to Page 1 into a structured document that constitutes a page (a page set as a default) (for example, some pieces (an item name, the price, and the like) of the item information are described in a div tag (<div> . . . </div>), for example) and transmits the pages (structured document data constituting the page) to the user terminal 3 that has sent the sort request to thereby display the page on a web browser. In step S4, the system control unit 14 may transmit the item information of items included in the item group allocated to Page 1 using Ajax or the like, for example, rather than transmitting all data of the page. In this case, page switching is realized without refreshing the entire page (that is, the item list region is refreshed).

FIG. 9 is a diagram illustrating an example of a page displayed on the display screen of the user terminal 3 by the process of step S4. The page illustrated in FIG. 9 is the first of a total of ten pages to which item groups are allocated as illustrated in (A-2) of FIG. 6A. As illustrated in FIG. 9, an item list including items (13 hits) included in Price Range 1 can be displayed on Page 1. In the example illustrated in FIG. 9, a page region that is not present in the display screen is displayed when the user scrolls the screen. When the user selects "Next Page" (or a portion indicating a page number) displayed on the page illustrated in FIG. 9 (by clicking it using a mouse or touching using a finger, for example), a hyperlink allows the next page request to be transmitted to the information providing server 1. The system control unit 14 of the information providing server 1 having received the request inserts the item information of the items included in the item group allocated to the requested page into a structured document that constitutes a page (a page set as a default) and transmits the page to the user terminal 3 that has sent the sort request to thereby display the page on a web browser. In this case, page switching may be realized without refreshing the entire page with the aid of, for example, Ajax or the like.

FIG. 10 is a diagram illustrating an example of a page displayed on the display screen of the user terminal 3 when a user selects "Next Page" on the display screen illustrated in FIG. 9. The page illustrated in FIG. 10 is the second of a total of ten pages to which an item group is allocated as illustrated in (A-2) of FIG. 6A. As illustrated in FIG. 10, an item list that includes items (nine hits) included in Price Range 2 can be displayed on Page 2.

As described above, according to the embodiment, a plurality of item groups is determined based on a classification criterion corresponding to an attribute of an item that constitutes an item list, and the respective item groups are allocated to any one of a plurality of pages so that all items included in each of the plurality of determined item groups are displayed on the same page. Therefore, a number of items can be divided and displayed on a plurality of pages while maintaining the property that it is easy to compare items to each other. That is, it is possible to prevent items which are likely to be compared to each other from being posted on different pages.

Application Example 1

Figure 11A:
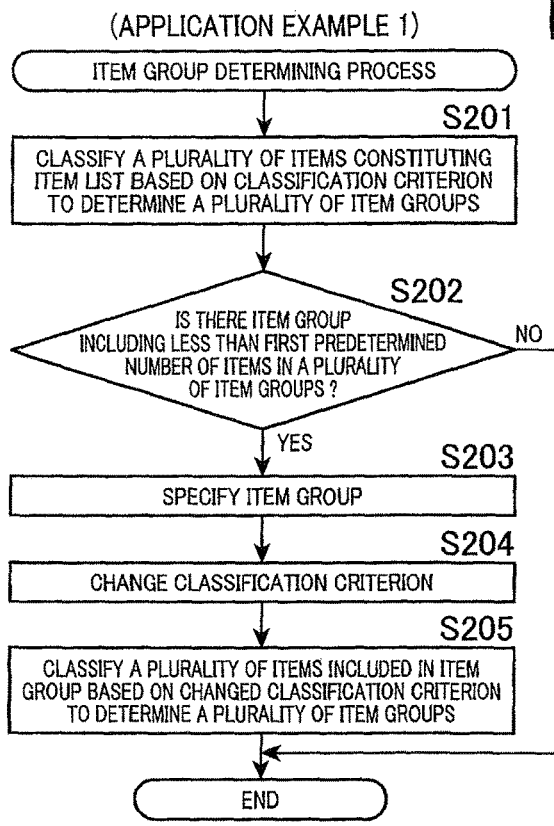
FIG. 11A is a flowchart illustrating an example of an "item group determining process" according to Application Example 1.

Next, Application Example 1 of the "item group determining process" of step S2 will be described with reference to FIG. 11A. Application Example 1 is an embodiment in which the number of items included in an item group is increased when a small number of items are included in the item group determined in step S2. FIG. 11A is a flowchart illustrating an example of the "item group determining process" according to Application Example 1. In the "item group determining process" illustrated in FIG. 11A, the system control unit 14 classifies a plurality of items constituting an item list based on a classification criterion, which is different from a classification criterion corresponding to the maximum number of hits to be displayed (for example, "ten hits") and which corresponds to an attribute of an item that constitutes an item list, to determine a plurality of item groups (which is temporarily determined until the process illustrated in FIG. 11A is ended) (step S201). The process of step S201 is performed in the same manner as the process of step S2. Subsequently, the system control unit 14 determines whether an item group that includes less than a first predetermined number (for example, five hits) of items is present in the plurality of item groups determined (temporarily rather than finally) in step S2 (step S202). When it is determined that an item group that includes less than the first predetermined number of items is not present in the plurality of determined item groups (step S202: NO), the system control unit 14 ends the process illustrated in FIG. 11A and proceeds to step S3. On the other hand, when it is determined that an item group that includes less than the first predetermined number of items is present in the plurality of determined item groups (step S202: YES), the system control unit 14 specifies the item group (step S203). In this case, the determination of the specified item group is cancelled. When a number of item groups that include less than the first predetermined number of items are present, the respective item groups are specified, and the processes of steps S204 and S205 are performed with respect to the respective item groups. Subsequently, the system control unit 14 changes the classification criterion so that the number of items included in the item group (that is, an item group in which the number of included items is less than the first predetermined number) specified in step S203 is equal to or larger than the first predetermined number (step S204). Then, the system control unit 14 classifies the plurality of items based on the classification criterion changed in step S204 to determine a plurality of item groups (step S205), ends the process illustrated in FIG. 11A, and proceeds to step S3. For example, the system control unit 14 changes the classification criterion so that a width of each range increases. Herein, when the classification criterion corresponds to the price of item, the width of each range is increased from "200 yen" to "400 yen," for example (that is, the width of the price range is increased). Alternatively, when the classification criterion corresponds to the evaluation of item, the width of each range is increased from "0.5" to "1.0," for example (that is, the width of the evaluation range is increased). Still alternatively, when the classification criterion corresponds to the genre of item, the width of each range is raised to Level 3 which is one step above Level 4 of category (the width of the range is increased for each branch number (-1, -2, -3, . . . ) of Level 3 of the genre). In this manner, the system control unit 14 classifies a plurality of items based on the changed classification criterion to determine a plurality of item groups, and then executes the allocating process of step S3. According to such a configuration, it is possible to reduce pages in which a small number of items are displayed while maintaining the property that it is easy to compare items to each other. As a result, it is possible to reduce a communication load and a system load.

As another embodiment in which the number of items included in an item group is increased, a plurality of item groups may be merged rather than changing the classification criterion. In this case, when a plurality (for example, two) of item groups that includes less than the first predetermined number of items is present in the plurality (for example, twelve) of item groups determined in step S2, the system control unit 14 specifies the plurality of item groups including less than the first predetermined number of items. Subsequently, the system control unit 14 merges the plurality of specified item groups to determine one item group. In this case, for example, the system control unit 14 specifies a plurality of item groups which is adjacent to each other among the plurality of item groups arranged in the arrangement order in step S1 and merges the plurality of specified item groups. In this case, for example, Price Range 4 (five hits) and Price Range 5 (five hits) which are adjacent to each other as illustrated in (A-1) of FIG. 6A are merged to determine an item group of one price range 4 & 5 (10 hits). In such a configuration, since it is not necessary to classify the plurality of items based on the changed classification criterion, it is possible to shorten the processing time while obtaining the above-described advantages. The system control unit 14 may be configured to merge the plurality of specified item groups regardless of the arrangement order. In this case, for example, Price Ranges 5 (five hits) and 11 (four hits) which are not adjacent to each other (that is, other price ranges are interposed between both price ranges) as illustrated in (A-1) of FIG. 6A are merged and an item group of one price range 5 & 11 (nine hits) is determined. In such a configuration, since items included in the same item group are displayed on the same page, it is possible to shorten the processing time while obtaining the above-described advantages.

Application Example 2

Figure 11B:
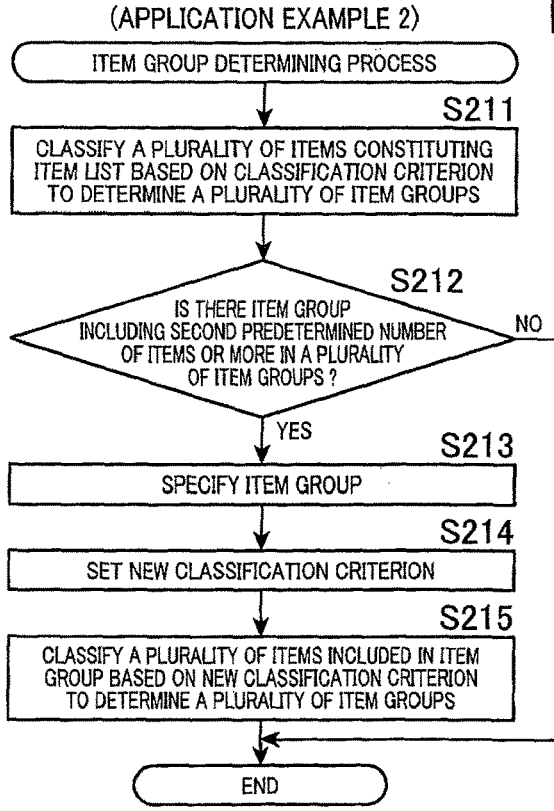
FIG. 11B is a flowchart illustrating an example of an "item group determining process" according to Application Example 2.

Next, Application Example 2 of the "item group determining process" in step S2 will be described with reference to FIG. 11B and FIGS. 12A and 12B. Application Example 2 is an embodiment in which the number of items included in an item group is decreased when a large number of items are included in the item group determined in step S2. FIG. 11B is a flowchart illustrating an example of the "item group determining process" according to Application Example 2. FIGS. 12A and 12B are diagrams illustrating an example of the result in which a plurality of items constituting an item list is classified into a plurality of item groups. In the "item group determining process" illustrated in FIG. 11B, the system control unit 14 classifies a plurality of items constituting an item list based on a classification criterion which is different from a classification criterion corresponding to the maximum number of hits to be displayed (for example, "ten hits") and which corresponds to an attribute of an item that constitutes an item list to determine a plurality of item groups (which is temporarily determined until the process illustrated in FIG. 11B is ended) (step S211). The process of step S211 is performed in the same manner as the process of step S2. Subsequently, the system control unit 14 determines whether an item group that includes a second predetermined number (for example, twenty five hits) of items or more is present in the plurality of item groups determined in step S211 (step S212). When it is determined that an item group that includes the second predetermined number of items or more is not present in the plurality of determined item groups (step S212: NO), the system control unit 14 ends the process illustrated in FIG. 11B and proceeds to step S3. On the other hand, when it is determined that an item group that includes the second predetermined number of items or more is present in the plurality of determined item groups (step S212: YES), the system control unit 14 specifies the item group (step S213). In this case, the determination of the specified item group is cancelled. When a number of item groups that include the second predetermined number of items or more are present, the respective item groups are specified, and the processes of steps S214 and S215 are performed with respect to the respective item groups. Subsequently, the system control unit 14 sets a new classification criterion for the item group (that is, an item group in which the number of included items is the second predetermined number or more) specified in step S213 (step S214). Then, the system control unit 14 classifies a plurality of items included in the specified item group based on the new classification criterion set in step S214 so that the number of items included in the specified item group is less than the second predetermined number to determine a plurality of item groups (step S215), ends the process illustrated in FIG. 11B, and proceeds to step S3. For example, the system control unit 14 sets a new classification criterion which uses a narrower (finer) width of each range than the width of each range used in the initial classification criterion. Herein, when the classification criterion corresponds to the price of item, a new classification criterion is set so that the width of each range for the specified price range is narrowed from "200 yen" to "20 yen," for example. Alternatively, when the classification criterion corresponds to the evaluation of item, a new classification criterion is set so that the width of each range is narrowed from "0.5" to "0.1," for example. Still alternatively, when the classification criterion corresponds to the genre of item, a new classification criterion is set so that the width of each range is lowered to Level 5 which is one step below Level 4 of category as illustrated in FIG. 12B, for example (the width is narrowed for each branch number (-1, -2, -3, . . . ) of Level 5 of the genre). In this manner, the system control unit 14 classifies a plurality of items included in the specified item group based on the new classification criterion to determine a plurality of item groups and then executes the allocating process of step S3. According to such a configuration, it is possible to reduce pages in which a large number of items are displayed while maintaining the property that it is easy to compare items to each other and to reduce the unevenness in the numbers of items displayed on the respective pages. Moreover, in the "item group determining process" of Application Example 1, when the item group that includes the second predetermined number of items or more is present after changing the classification criterion so that the width of each range increases, the system control unit 14 may classify the plurality of items included in the item group based on a new classification criterion for the item group so that the number of items included in the item group is less than the second predetermined number to determine a plurality of item groups. According to this configuration, it is possible to further reduce the unevenness in the numbers of items displayed on the respective pages.

In the embodiments described above, items retrieved based on search conditions input by a user and items (transaction objects) selected by the user and recorded in a browsing history, a purchase history, a registration history, and the like have been described as examples of "a plurality of elements constituting a list" according to the present invention. However, the elements are not limited to these examples, and the present invention can be applied to items that are registered to an item list that is generated arbitrarily, for example. Other elements to which the present invention can be applied may be any elements that constitute a list, and the present invention can be applied to shops that sell items, facilities such as lodging facilities, amusement facilities, or golf links, and various services (for example, lodging plans or travel plans). Moreover, the present invention can be applied in such a way that search objects retrieved by a search server that retrieves information (that is, web pages including the information) provided on the network NW are used as a plurality of elements constituting a retrieval result list. In this case, scores assigned to search objects (scores for determining an arrangement order (display order) in the retrieval result list) is used as attribute of the search objects, and the plurality of search objects is classified based on a classification criterion corresponding to the score of the search object and a plurality of element groups is determined.

REFERENCE SIGN LIST

1: information providing server
2: shop terminal
3: user terminal
11: communication unit
12: storage unit
12a: membership information DB
12b: genre information DB
12c: shop information DB
12d: item information DB
12e: browsing history DB
12f: purchase history DB 12g: reference list registration history DB
13: input/output interface
14: system control unit
14a: CPU
14b: ROM
14c: RAM
15: system bus
NW: network
S: information providing system

The invention claimed is:

1. An information processing apparatus, which classifies and displays a plurality of elements constituting a list on a plurality of pages, the information processing apparatus comprising:
at least one memory operable to store program code;
at least one processor operable to read said program code and operate as instructed by said program code, said program code including:
determining code configured to cause said at least one processor to classify the plurality of elements, based on a classification criterion which is different from a classification criterion corresponding to a limit number of elements to be displayed per page and which corresponds to an attribute of the element, to determine a plurality of element groups; and
allocating code configured to cause said at least one processor to allocate the plurality of element groups determined by the determining code to a plurality of pages, the allocating code configured to cause said at least one processor to allocate the respective element groups to any one of the plurality of pages so that all elements included in one element group are displayed on the same page,
wherein the allocating code is configured to cause said at least one processor to determine a first specified element group from among the plurality of determined element groups that includes less than a first number of elements to be displayed, determine whether a second specified element group adjacent to the first specified element group includes less than the first number of elements to be displayed in response to determining the first specified group that includes less than the first number of elements to be displayed, determine whether the first specified group and the second specified group collectively include less than a second number of elements to be displayed in response to determining the first specified element group contains less than the first number of elements to be displayed and the second specified element group contains less than the first number of elements to be displayed, allocate the first specified group to a first page of the plurality of pages and the second specified group to a second page of the plurality of pages in response to determining the first specified group and the second specified group collectively include at least the second number of elements to be displayed, and allocate both the first specified group and the second specified group to the first page in response to determining the first specified group and the second specified group collectively include less than the second number of elements to be displayed, and
wherein the second number of elements to be displayed is greater than or equal to the first number of elements to be displayed.

2. The information processing apparatus according to claim 1,
wherein the allocating code is configured to cause said at least one processor to allocate all elements included in each of the plurality of element groups to the same page so that the number of elements displayed on the same page falls within a predetermined range based on the limit number of elements to be displayed.

3. The information processing apparatus according to claim 1,
wherein the determining code is configured to cause said at least one processor to specify an element group that includes less than a first predetermined number of elements from among the plurality of determined element groups, change the classification criterion so that the number of elements included in the specified element group is the first predetermined number or more, and classify the plurality of elements based on the changed classification criterion to determine a plurality of element groups.

4. The information processing apparatus according to claim 1,
wherein the plurality of determined element groups are adjacent to each other among the plurality of element groups arranged in a predetermined arrangement order.

5. The information processing apparatus according to claim 1,
wherein the determining code is configured to cause said at least one processor to specify an element group that includes a second predetermined number of elements or more from among the plurality of determined element groups, and classify a plurality of elements included in the specified element group based on a new classification criterion for the specified element group so that the number of elements included in the specified element group is less than the second predetermined number to determine a plurality of element groups.

6. The information processing apparatus according to claim 1, wherein the second number of elements to be displayed is greater than the first number of elements to be displayed.

7. The information processing apparatus according to claim 1, wherein a display size of each of the plurality of elements constituting the list is fixed.

8. The information processing apparatus according to claim 1, wherein the plurality of elements constituting the list are arranged in a longitudinal direction.

9. An information processing method of classifying and displaying a plurality of elements constituting a list on a plurality of pages, the information processing method, comprising:
classifying the plurality of elements based on a classification criterion which is different from a classification criterion corresponding to a limit number of elements to be displayed per page and which corresponds to an attribute of the element to determine a plurality of element groups; and
allocating the plurality of element groups to a plurality of pages, the respective element groups being allocated to any one of the plurality of pages so that all elements included in one element group are displayed on the same page,
wherein the allocating comprises:
determining a first specified element group from among the plurality of determined element groups that includes less than a first number of elements to be displayed;
determining whether a second specified element group adjacent to the first specified element group includes less than the first number of elements to be displayed in response to determining the first specified element group includes less than the first number of elements to be displayed;

determining whether the first specified group and the second specified group collectively include less than a second number of elements to be displayed in response to determining the first specified element group contains less than the first number of elements to be displayed and the second specified element group contains less than the first number of elements to be displayed;

allocating the first specified group to a first page of the plurality of pages and the second specified group to a second page of the plurality of pages in response to determining the first specified group and the second specified group collectively include at least the second number of elements to be displayed; and allocating both the first specified group and the second specified group to the first page in response to determining the first specified group and the second specified group collectively include less than the second number of elements to be displayed, wherein the second number of elements to be displayed is greater than or equal to the first number of elements to be displayed.

\* \* \* \* \*